United States Patent [19]
Burnett

[11] 3,858,053
[45] Dec. 31, 1974

[54] SLIDE CONTROL MECHANISMS FOR MACHINE TOOLS

[75] Inventor: Alan Burnett, Coventry, England

[73] Assignee: Wickman Machine Tool Sales Limited, Coventry, Warwickshire, England

[22] Filed: June 20, 1973

[21] Appl. No.: 371,869

[30] Foreign Application Priority Data
June 22, 1972 Great Britain.................... 29218/72

[52] U.S. Cl.............. 250/555, 250/214 R, 82/21 A, 82/21 B
[51] Int. Cl............................................. G01d 5/34
[58] Field of Search..................... 82/21 B, 21 A, 5; 235/151.11; 250/237.6

[56] References Cited
UNITED STATES PATENTS
3,174,367  3/1965  Lukens............................ 82/5
3,195,383  7/1065  Connelly........................ 82/21 B
3,381,557  5/1968  Dunn................................. 82/5
3,755,682  8/1973  Russell........................ 250/237 G
3,770,970  11/1973  Trump......................... 250/237 G FOREIGN PATENTS OR APPLICATIONS
907,387  10/1962  Great Britain................. 82/21 B Primary Examiner—Andrew R. Juhasz
Assistant Examiner—W. R. Briggs
Attorney, Agent, or Firm—Holman & Stern

[57] ABSTRACT

An electronic control system for the tool slides of machine tools in which there is provided an optical encoder driven by the machine shaft and producing speed, direction and revolution signals, the signals with being transmitted through other electronic apparatus to an electrical drive motor for the slide.

7 Claims, 10 Drawing Figures

3,858,053

SLIDE CONTROL MECHANISMS FOR MACHINE TOOLS

BACKGROUND OF THE INVENTION

This invention relates to control mechanisms whereby the slides of machine tools, such as lathes, can be conveniently and efficiently controlled.

It is required that such control mechanisms should regulate not only the stroke or maximum permitted movement of a slide, but also its speed during different parts of its operating cycle. It is, moreover, necessary to determine the position of the slide at any point in the cycle and this has been carried out by a numerical control system whereby the required speed and travel is imparted to a slide by supplying signals to an electrical drive device whereby the slide is moved, through a fluid pressure operated piston and cylinder unit.

OBJECT AND SUMMARY OF THE INVENTION

It is the object of this invention to provide an electronic system for a control mechanism for a machine tool slide, in an effective and accurate form.

According to the present invention, an electronic system for a machine tool slide control mechanism comprises an optical encoder which is driven from a main shaft of the machine and which provides output signals related to the speed of rotation, angular position and also the number of completed revolutions of the main shaft, with said optical encoder output signals being transmitted to an electrical drive motor whereby the slide mechanism is actuated.

BRIEF DESCRIPTION OF THE DRAWINGS

The invention will now be described by way of example with reference to the accompanying drawings, in which:-

DETAILED DESCRIPTION OF THE EMBODIMENTS

Figure 1:
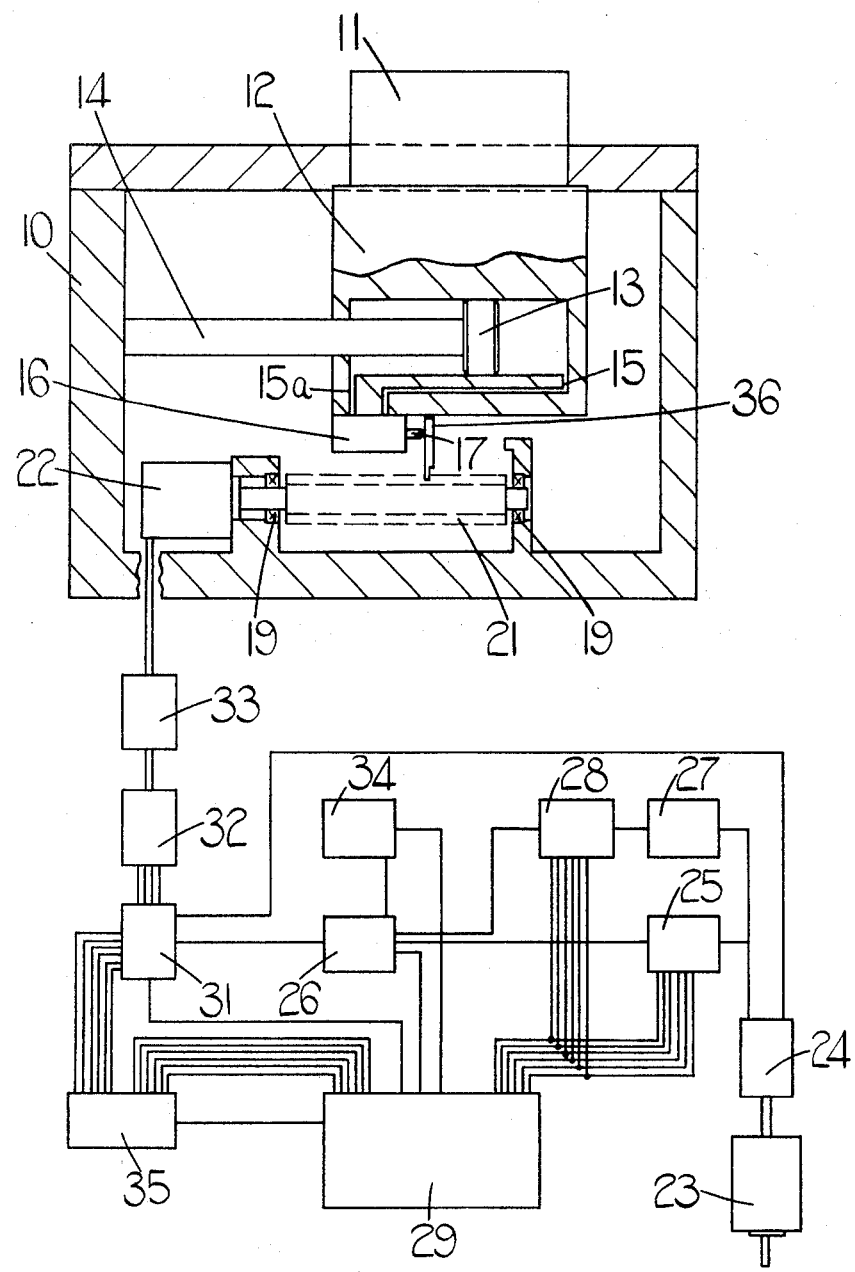
FIG. 1 is a diagrammatic representation of a slide control mechanism constructed in accordance with the invention and including electronic control thereof.
Figure 2:
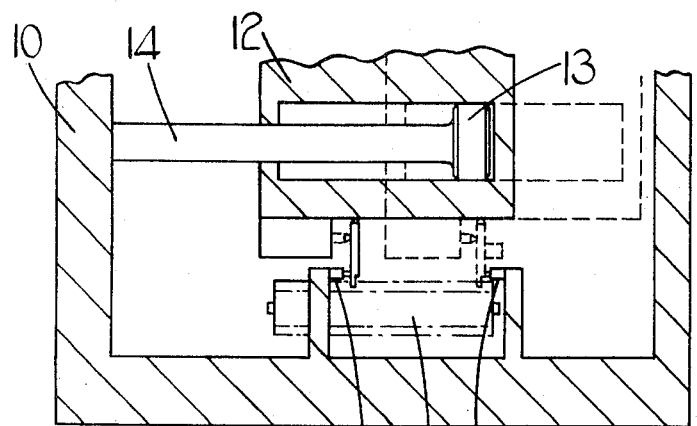
FIG. 2 is a view of the slide control mechanism in a different position.

With reference to FIG. 1, there is illustrated a support 10 for a slide 11. The support 10 is mounted on the bed of a lathe and the slide 11 is arranged to move towards and away from a work station for the purpose of performing a cutting operation upon a workpiece. The slide has means (not shown) for supporting tools whereby cutting is carried out.

To actuate slide movement relatively to the support 10, the slide 11 has connected thereto a cylinder 12, in which is slidably mounted a piston 13, with a rod 14 thereof being secured to the support 10.

Figures 3, 4:
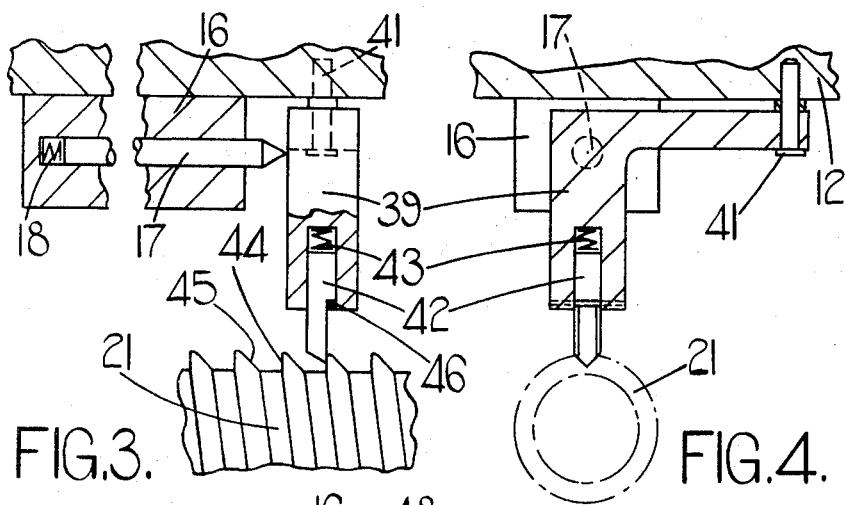
FIG. 3 is an enlarged fragmentary view of a stylus and associated parts used in the mechanism.
FIG. 4 is an end view of the stylus and said parts.
Figure 5:
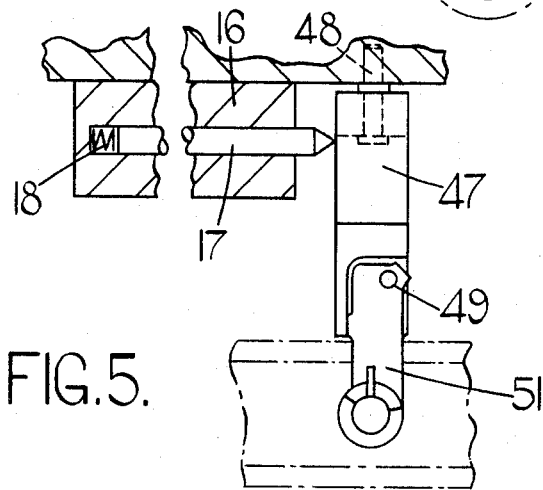
FIG. 5 shows an alternative form of stylus.
Figure 6:
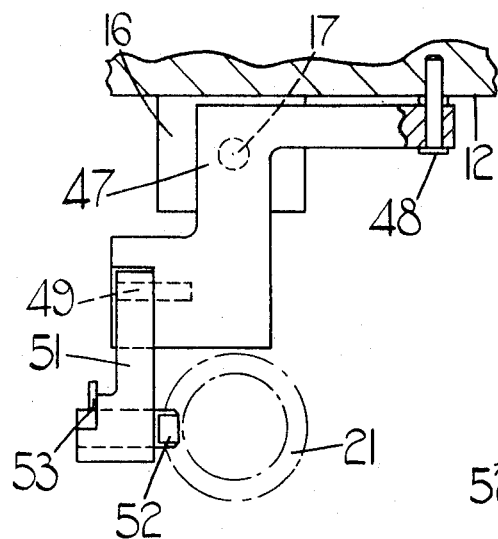
FIGS. 6 and 7 are end and plan views respectively of the form of the stylus shown in FIG. 5, FIGS. 8 and 9 are further views of the form of stylus of FIGS. 5, 6 and 7 and, FIG. 10 is a view of an alternative slide control mechanism.
Figure 7:
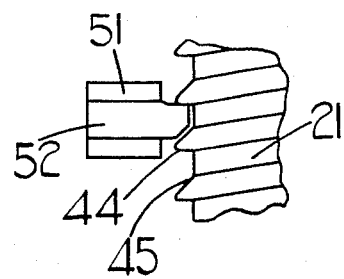
Figure 8:
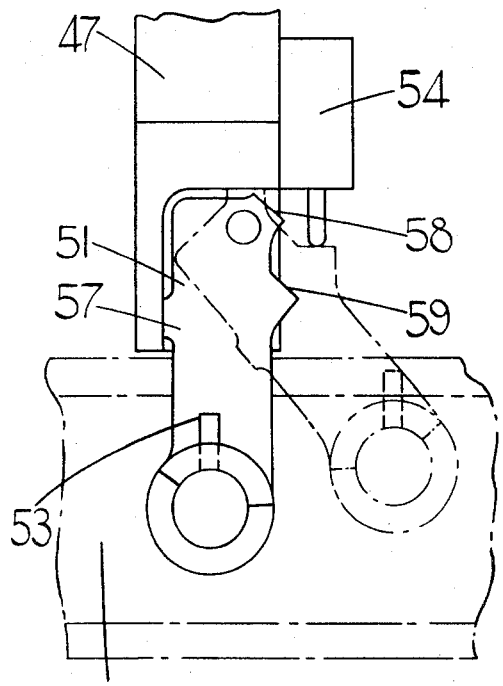

The cylinder 12 has inlet and outlet passages 15 and 15a connected to the ends of the cylinder respectively. Admission and escape of motive fluid to and from the ends of the cylinder are controlled by a servo valve 16, which, as shown in FIG. 3, has a spool 17, mounted in its body, the spool extending out of one end of the body. Within the body moreover, the other end of the spool is engaged by a spring 18, urging the spool outwardly of the body.

Mounted in a pair of spaced bearings 19, in the support 10, is a screwed spindle 21. This spindle has its axis parallel to the piston and cylinder axes. The screwed spindle is, moreover, located against axial movement and can only rotate. To rotate the screwed spindle 21, there is an electrical stepping motor 22 mounted in the support 10.

There is electronic control for the stepping motor 22, which is shown in FIG. 1. This comprises an optical encoder 23 which is drivingly connected to a main shaft of the machine tool. This is the shaft on which workpieces are rotatably carried. The encoder 23, provides two step-pulse outputs in quadrature which are supplied to a noise reducer and direction sensor 24. The output from this is supplied either to a rate multiplier 25 and thence to a multiplexer 26, or through a fixed rate multiplier 27 and a rate divider 28 again to the multiplexer 26.

The rate multiplier 25 receives signals from a control 29, which is pre-set to determine the required operating cycle of the slide. This can be pre-programmed or manually set. The rate multiplier 25, is arranged to modify the pulse frequency from the optical encoder 23, in accordance with the signal received from the control 29.

Alternatively, the pulse train from the encoder 23 is operated upon the rate multiplier 27 and modified by means of the rate divider 28 in accordance with signals received from the control 29.

The multiplexer 26 also receives a signal from the control 29 and transmits one or other of the pulse trains to a reversible counter 31. The reversible counter 31 receives three inputs. It receives an instruction signal from the control 29, the pulse train from the multiplexer 26, and a signal related to direction of spindle rotation from the noise reducer and direction sensor 24. The output of the reversible counter 31 is emitted in phased relationship for directional sense. There are two outputs from such reversible counter 31, with one of them being supplied to a digital analogue converter 32 which provides an additive or subtractive voltage change in the output equivalent to the required feed, this being fed to an output drive 33, which provides a power supply to the stepping motor 22, in order to operate it.

The optical encoder therefore provides an output signal which is related to the speed of rotation of the main shaft of the machine. Furthermore, the angular position of the main shaft as well as the number of completed revolutions in the cycle are also reflected in the output signals. This makes the system suitable for screw cutting and similar operations.

The optical encoder comprises a thin disc mounted on a rotatable shaft with the disc having discrete areas permitting the passage of light. At one side of the disc is a series of light sources and at the other side light cells to detect the presence or absence of light as the disc rotates. The signals received by the cells are converted to electric signals to enable the shaft position to be indicated. Such optical encoders can be obtained from manufacturers in the U.S.A., such as Baldwin.

If the feed of the slide is required to be independent of the rotation of the main shaft, a signal is supplied from the control 29 to an oscillator 34 which provides a pulse train into the multiplexer 26. This provides an output to the reversible counter 31, and thence through the analogue converter 32 and the output drive 33 to the stepping motor 22.

Directional sense is however obtained through the control 29 instead of the direction sensor 24.

There is also a feed back control to a comparator 35 which receives signals from the control 29. As feed of the slide progresses, a cumulative pulse count is fed by the reversible counter 31 to the comparator 35. When the two inputs are equal, a signal is transmitted from the comparator 35 to the control 29 which then modifies the output signals to other units in the circuit causing cessation of feed or change of feed rate or change of directional sense or combinations thereof. The changes which take place are in accordance with pre-set arrangements of the control 29.

Rotation of the screwed spindle 21 causes linear motion of a stylus 36 therealong. The stylus is in contact with the spool 17 of the servo valve 16 and is arranged to move the spool against its spring to control the servo valve which in turn controls the supply and exhaust of motive fluid from the cylinder for the purpose of moving the slide 11. Stylus movements in relation to the spool are, however, small. The limits of travel of the stylus lengthwise of the support 10 are controlled by respective switches 37, 38, which are adjustably mounted upon the support 10.

The stylus 36 is, as shown in FIGS. 3 and 4, in the form of an L-shaped member 39, pivotally mounted on the cylinder body 12 about a pin 41. This pin is situated at one end of the L and the other end has a socket for reception of a spring loaded stylus pin 42. A spring 43 thereof is a compression spring and urges the stylus pin 42 into contact with the screwed spindle 21. The screw threads of the spindle 21 are of saw tooth form having leading faces which are substantially perpendicular to the axis of rotation of the spindle and trailing faces which are inclined thereto. These faces are identified at 44 and 45 respectively. The outward-movement of the stylus pin 42 from its socket in the member 39 is, however, limited by a stop pin 46.

The stylus pin has a flat face engaging the leading face 44 of the screw thread and is held in contact therewith through the spring 18 of the servo valve 16.

In the event that the screwed spindle 21 is rotated beyond a limit position for movement of the member 39, damage is avoided by allowing the trailing face 45 of the screw thread to engage the pin which is correspondingly shaped so that the stylus 42 compresses its spring 43.

It is, however, arranged that the stylus pin can not, under normal conditions, pass over the screw threads from one groove to the next.

In the alternative form shown in FIGS. 5 to 9, the stylus comprises a member 47, which is also of generally L-shape. At one end it has a pivot pin 48, engaging in the cylinder body 12. At the other end it has a further pivot pin 49 on which is mounted a further member 51 which in turn has secured thereto a stylus pin 52. To axially locate the stylus pin into the member 51 is a peg 53. The stylus pin end is shaped to correspond with the thread groove shape of the screwed spindle 21.

The stylus pin can, therefore, move about two mutually perpendicular axes, both of which are perpendicular to the axis of the screwed spindle 21. If the screwed spindle over travels, damage to the stylus pin is avoided by allowing it to pivot in the manner indicated in dotted lines in FIG. 8. Moreover, the stylus pin itself is rotatable in the member 51 so that its face will engage the flat leading face 44 of the screw thread despite angular displacement. To limit such angular displacement, the member 47 has attached thereto a limit switch 54 which provides an electrical signal to cut off the supply of current to the electrical stepping motor thus positively stopping the screwed spindle from rotating.

Furthermore, to limit movement of the member 51 in relation to the member 47, there are provided two surfaces 57, 58 which engage the member 47 at opposite limit positions of the member 51. The switch 54 moreover engages a further surface 59 on the member 51 simultaneously with engagement of the surface 58 with the member 47.

Figure 9:
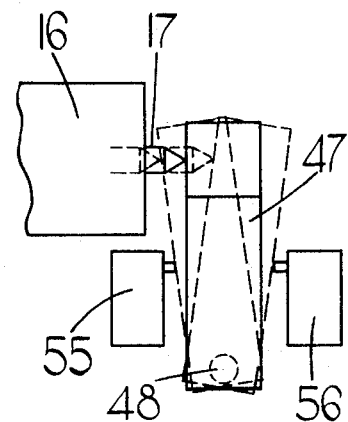

To limit movement of the member 39 or 47 about its pivot pin 41 or 48 respectively and therefore in relation to the spool 17 of the servo valve 16, there are two further electrical switches 55, 56 arranged at opposite sides of the member respectively. This arrangement is illustrated in FIG. 9. The limit switches are connected into the control circuit in order to stop further travel of the screwed spindle 21.

The apparatus shown in FIGS. 1 to 9 are described and claimed in U.S. Patent application Ser. No. 360,749 filed May 16, 1973.

Figure 10:
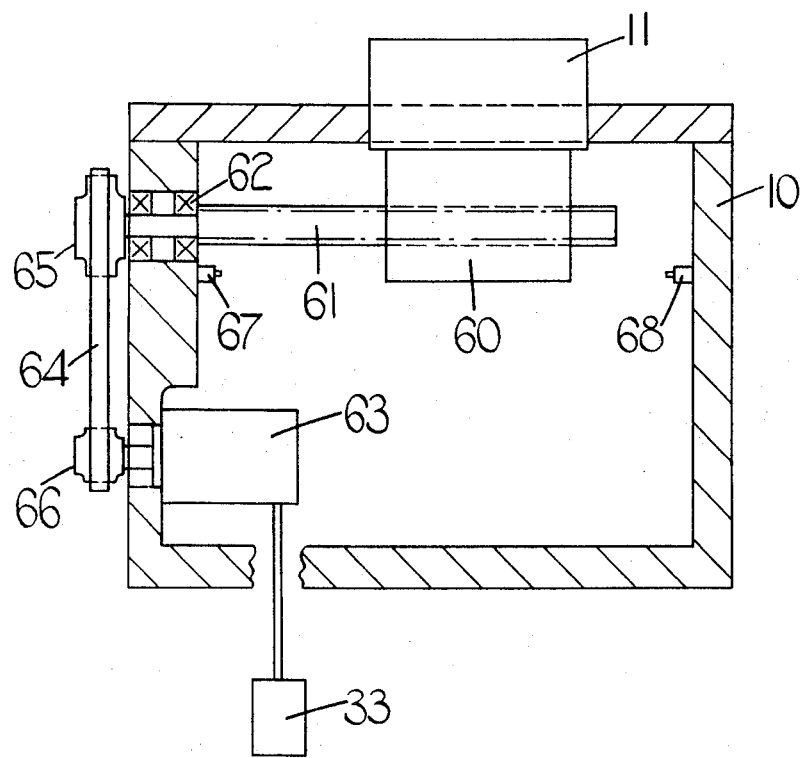

In the example shown in FIG. 10, a support 10 mounted on a lathe bed carries a slide 11. Attached to the slide 11 is a nut member 60 engaging on a lead screw 61 supported in a bearing 62 in the support 10. A stepping motor 63 fixed to the support 10 is arranged to rotate the lead screw 61 through a toothed belt 64 on respective pulleys 65, 66. The toothed belt drive may be replaced by a gear transmission.

Limit switches 67, 68 control the maximum permitted movement of the slide 11. The stepping motor is controlled by the electronic numerical control previously described. An output drive 33 thereof is shown in FIG. 10.

The embodiments described are particularly applicable to a conventional slide and slideway but the invention can also be applied to an indexable turret having a number of faces on which cutting tools can be mounted. Only one face is operative at any one time and hence movement of the turret can be controlled as described in relation to the conventional form of slide.

I claim:

1. An electronic system for a machine tool slide control mechanism comprising an optical encoder which is driven from a main shaft of the machine and which provides output signals related to the speed of rotation, angular position and also the number of completed revolutions of the main shaft, said optical encoder output signals being transmitted to an electrical drive motor whereby the slide mechanism is actuated, the output of the optical encoder being in the form of two step-pulse output signals supplied to a direction sensor, the output of this being applied to a rate multiplier and thence to a multiplexer, the multiplexer receiving also a signal from a control pre-set for the required slide operation, signals from the multiplexer being supplied to a reversible counter, and an output from this being supplied to a digital analogue converter to provide power supply for the electrical drive motor.

2. The electronic system as claimed in claim 1 in which the output from the direction sensor is supplied to the multiplexer through a rate multiplier.

3. The electronic system as claimed in claim 2 in which there is also a rate divider which receives signals from said control as well as from the optical encoder.

4. The electronic system as claimed in claim 1 in which the reversible counter receives signals related to the machine spindle rotational direction, from the control and from the multiplexer.

5. The electronic system as claimed in claim 1 with an electrical stepping motor which is the electrical drive motor for the slide.

6. The electronic system as claimed in claim 1 in which the electrical drive motor for the slide is a stepping motor which operates a screw which has engaged with it a stylus arranged to operate a servo device for controlling movement of the slide.

7. The electronic system as claimed in claim 1 in which the electrical drive motor for the slide is a stepping motor which operates a screw and nut mechanism whereby the movement of the slide is controlled.

* * * * *